United States Patent Office 3,385,376
Patented May 28, 1968

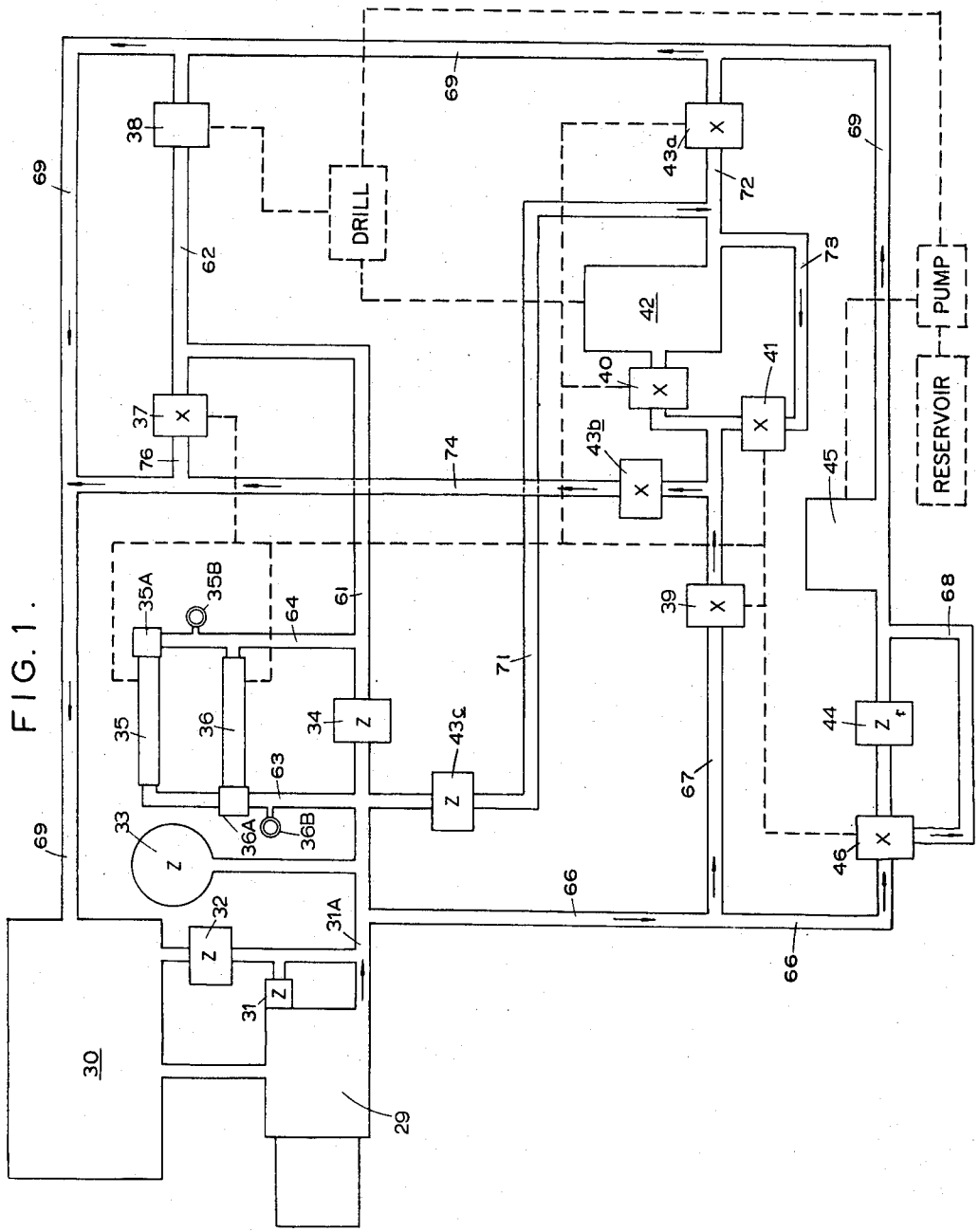

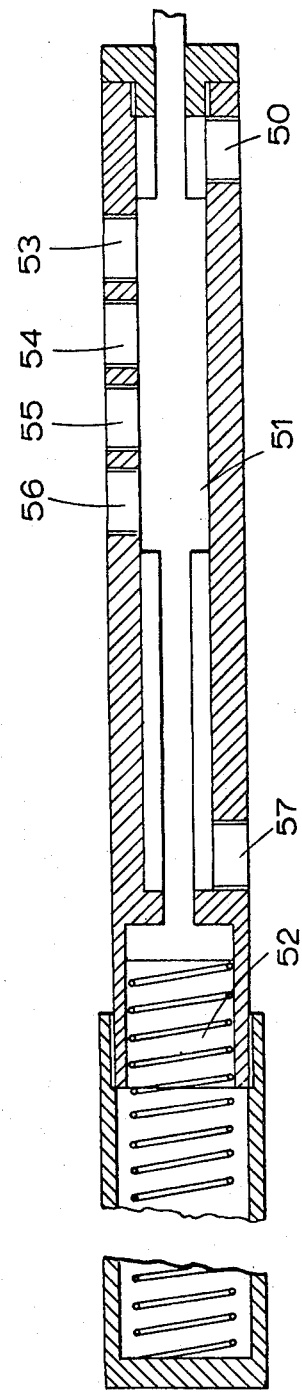

3,385,376
DRILLING APPARATUS WITH MEANS FOR CONTROLLING THE FEED AND SUPPLY OF DRILL FLUID TO THE DRILL
Henry Hobhouse, Bottom Barn, Castle Cary, Somerset, England
Filed July 28, 1966, Ser. No. 568,602
5 Claims. (Cl. 173—8)

ABSTRACT OF THE DISCLOSURE

Control apparatus for a drilling device in which the feed of the drill is varied in accordance with increases or decreases in the drilling torque. If the torque increases above a predetermined value, the flow of drill fluid is increased. If the torque continues to increase, the drill feed is reduced or reversed. If none of the above steps prevents the torque from increasing, the drill rotation is stopped. When torque decreases below a predetermined value, the flow of drill fluid is increased and the drill feed is also increased. If neither of these steps prevent the torque from decreasing, the drill rotation is stopped.

---

The invention relates to variable speed drilling apparatus.

It is among the objects of the invention to provide hydraulically operated variable speed drilling apparatus which has advantages in respect of weight and efficiency compared with apparatus operated mechanically, electrically, or by compressed air.

In drilling operations the efficiency is dependent upon the relation between:

(1) the rotational speed of the bit.
(2) the pressure applied to engage the bit with the work piece.
(3) the nature of the material through which the bit is passing.

It is also an object of the invention automatically to control the relation between these three variables so that the operation is efficient regardless of variation in the material being drilled or the condition of the bit.

According to the invention, the drilling apparatus comprises a hydraulic drill motor for rotating a drill, a hydraulic feed motor for the drill and a hydraulic motor driving a drill fluid supply pump supplying a fluid or lubricant to the drill. These motors are interconnected so that in operation the feeds of pressure fluid to operate the feed motor and the motor driving the drilling fluid supply pump are under the control of sequence valves, which sequence valves are operated by the pressure existing in the feed of pressure fluid to the drill motor, whereby the feed of the drill and the supply of drilling fluid to the drill are dependent upon the resistance to rotation of the drill.

The sequence valves are responsive to torque changes and therefore are effective to control and direct the flow of the hydraulic fluid in the circuit so as to maintain maximum efficiency irrespective of variations of torque on the drilling bit.

Apparatus according to the invention may be utilised with soil investigation rigs and in earth, or rock boring.

The basic sequence of operations may be summarised as follows:

When torque rises above a predetermined value, drilling fluid is increased, if torque continues to rise the feed is successively reduced, stopped, and then reversed; if none of these stages prevents the torque from rising the drill is stopped.

When torque falls below a predetermined value flow of drill fluid is increased and feed is also increased and if neither of these steps prevent the torque from decreasing the drill is stopped.

In one known means of earth boring the bit, which is of metal and which may be inset with diamonds, is lubricated with a mixture of water and mineral dust, to form a mud which lubricates and cools the bit and causes it to "bite." This mud is pumped through the series of steel tubes, which also apply the torque to the bit. Besides the known disadvantages of transmitting torque through tubes in sectional form, excessive pressure will tend to damage the bit or the tube, and insufficient pressure will "polish" the bit. The pressure must therefore be limited by experience or "know-how." Furthermore the correct speed of the drilling rig under differing conditions and materials, which may vary from quartz to soft mud, can only be controlled by rule of thumb methods, and, while there is a known ratio between pressure on the bit, speed of bit revolution and volume and pressure of the lubricant being pumped, these factors can only be worked out accurately under laboratory conditions because there is no known means of achieving the optimum relationship in field conditions. Thus with identical drills, equipment, and soil conditions the footage results and the effective life of bits may differ widely depending on experience, luck and good judgement of the operators.

In the earth boring apparatus according to the invention the control means are pre-set according to correlated data in respect of the speed of revolution, the pressure on the bit, and the volume and pressure of mud, or drill fluid required to lubricate, cool and engage the bit.

The invention is illustrated by way of example in the accompanying diagrammatic drawings in which:

FIGURE 1 is a block diagram of a torque control system for operation of apparatus according to the invention for earth drilling, including mud flush drilling, and FIGURE 2 is a sectional view of a sequence valve incorporated in control means according to the invention.

Referring to FIGURE 1, a prime mover and pump 29, fed from a reservoir 30 feeds line 31A under the pressure control of a pump actuator 31 and a system relief valve 32. An accumulator 33 smooths any pulsations from the pressure source. The feed line 31A is connected to a pressure valve 34, which valve is manually preset so as to maintain the desired pressure level in the system. The valve 34 is in turn connected by means of fluid lines 61 and 62 to the hydraulic drill motor 38, which motor is used for rotating the drill.

A pair of sequence valves 35 and 36 are connected in parallel with the pressure valve 34, the details of the sequence valves to be explained hereinafter. The sequence valves are connected by means of fluid lines 63 and 64 to the fluid lines 31A and 51, respectively, on opposite sides of the pressure valve 34. The sequence valve 35 senses a fall in the torque on the drill motor 38 since this causes a corresponding pressure decrease in the fluid contained in the lines 61, 62 and 64, the sequence valve thus sensing the pressure differential across the valve 34, which pressure differential exists between the lines 63 and 64. Similarly, the sequence valve 36 senses a torque increase on the drill motor 38, which causes a pressure increase in the lines 61 and 62, the valve 36 thus sensing the pressure differential which exists between the lines 63 and 64. Isolators 35A and 36A, such as conventional manually controlled valves, are contained in the lines 63 and 64 so as to isolate or immobilize the sequence valves 35 and 36 to allow starting up of the control circuit. Further, pressure gauges 35B and 36B are provided in the lines 63 and 64 so as to indicate the pressure therein.

The feed to the drill motor 38 through the preset valve 34 may be overridden by a servo valve 37 in the line 62, which valve is controlled from the sequence valves 35 and 36, and can be opened to stop the drill motor 38 as explained below.

All the circuit components marked Z are pre-set by hand and control is then automatic.

The servo valves marked X are controlled by either or both of the sequence valves 35 and 36. FIGURE 1 illustrates the servo valves marked X being connected to the sequence valves 35 and 36 by means of dotted lines, which dotted lines represent a conventional electric or fluidic control circuit for controlling the servo valves in response to the movements of the sequence valves. Such control circuits are well within the capabilities of those having ordinary skill in the art.

An inlet fluid line 66 is interconnected between the feed line 31A and a mud flush pump motor 45. The inlet line 66 contains therein a servo valve 46, which valve is interconnected to and controlled by the sequence valves 35 and 36, the valve 46 thus being responsive to and controlled by the torque rise or torque fall in the motor 38. A pressure valve 44 is also connected in the line 66 in series with the servo valve 46, the pressure valve 44 being manually preset to a desired pressure level. A bypass line 68 is connected to the servo valve 46 to provide a flow path parallel to the inlet line 66 so as to bypass the pressure valve 44. The opening or closing of the servo valve 46 is controlled by either the sequence valve 35 or 36 to provide for flow of fluid to the bypass line 68, thereby bypassing the pressure valve 44 so as to increase the flow or feed of fluid to the pump motor 45.

A hydraulic feed motor 42 for controlling the axial movement or feed of the drill is normaly supplied with fluid through the lines 71 and 72, the line 71 containing a manually preset valve 43c therein. The fluid exhausts from the feed motor 42 through the fluid lines 67 and 74, which lines contain the servo valves 40 and 43b therein, the fluid then flowing from the line 74 into the exhaust line 69 and from there into the reservoir 30. Upon fall in pressure in the system due to a torque fall, the valve 40 is opened wider than previously by the sequence valve 35 to permit more fluid to flow through the motor 42, thereby allowing a speed up of the motor 42 and thus increased feed of the drill. Upon rise of pressure in the system due to a torque rise in the drill motor 38, sequence valve 36 operates to open servo valve 41 contained in bypass line 73 whereby supply of fluid to the feed motor 42 is partly by-passed through the valve 41 to slow down the motor 42 and reduce the feed of the drill. Upon a serious pressure rise, such as reaching a predetermined maximum pressure, due to jamming or clogging of the drill, the sequence valve 36 opens normally closed servo valves 39 and 43a and closes servo valve 43b, whereby fluid flows through the lines 66 and 67 and through the servo valve 40 into the feed motor 42, the fluid then exhausting from the feed motor 42 through the line 72 and the servo valve 43a into the exhaust line 69. Feeding the feed motor 42 through the servo valves 39 and 40 thus causes the original movement of the feed motor 42 to be stopped, whereupon the movement of the motor is then reversed. Breakage of the drill bit due to over-loading is thus avoided and the drill can work at maximum safe torque at all times. If the steps set out above do not return the torque to the normal operating value, and either of the sequence valves 35, 36 is moved to an extreme position it is effective to open servo valve 37, whereupon the fluid then flows from the line 61 through the line 76 containing the opened servo valve 37 therein into the line 74, the fluid then flowing through the line 74 into the exhaust line 69 and back into the reservoir 30. Thus, opening of the valve 37 stops the drill motor 38 to prevent any further damage.

Advantageously the feed motor can be provided to operate a feed screw to follow the drill downwardly in vertical drilling or horizontally in horizontal drilling. By varying the speed of the screw the thrust or feed on the drill can be varied.

FIGURE 2 shows a sequence valve as illustrated and denoted 35 or 36 in FIGURE 1. Pressure fluid applied to the underside right hand connection 50, as shown on the drawing, will cause a slide 51 to move against the action of a spring 52 and against the action of a pressure fluid applied against the other end of the slide 51 by means of the connection 57, thereby uncovering connection ports 53, 54, 55, 56 on the topside at predetermined applied fluid pressures. Pressure fluid from these ports can be utilized to operate the servo valves illustrated in FIGURE 1. Assuming the valve illustrated in FIGURE 2 to be utilized as the torque rise sequence valve 36, then the fluid connection 50 would be connected to the fluid line 64 and the fluid connection 57 would be connected to the fluid line 63. Since the preset valve 34 maintains a substantially constant pressure on the downstream side thereof, the pressure in the line 63 and accordingly, the pressure supplied through the connection 57 to the rearward side of the slide 51, would be substantially constant. Accordingly, when the torque in the motor 38 increases, causing a corresponding increase in the pressure in the fluid in the lines 61 and 64, the fluid supplied through the connection 50 against the slide 51 would be at a greater pressure than the pressure of the fluid applied to the connection 57, whereupon the slide 51 would move leftwardly in FIGURE 2 against the spring 52 causing the ports 53, 54, 55 and 56 to be subsequently uncovered as the pressure in the lines 61 and 64 progressively increases.

I claim:

1. Control apparatus for a drilling device having a drill, comprising:

a source of pressure fluid;

a first hydraulic motor for rotating the drill;

first feed line means interconnecting said source of pressure fluid to said first hydraulic motor for supplying pressurized fluid thereto for driving same;

a second hydraulic motor for feeding said drill;

second feed line means interconnecting said source of pressure fluid to said second hydraulic motor for supplying pressurized fluid thereto for driving same;

a supply pump for supplying drilling fluid to said drill;

a third hydraulic motor interconnected to said supply pump for driving same;

third feed line means interconnecting said source of pressure fluid to said third hydraulic motor for supplying pressurized fluid therto for driving same;

first and second servo valve means operatively associated with said second and third feed line means, respectively, for controlling the flow of pressurized fluid to the respective hydraulic motors;

pressure responsive sequence valve means connected to said first feed line means, said sequence valve means being responsive to and controlled by the pressure of the pressurized fluid in said first feed line means, the pressure of the fluid in said first feed line means increasing or decreasing as the torque of said first hydraulic motor increases or decreases; and means operatively interconnecting said sequence valve means to said first and second servo valve means for controlling the movement of said servo valve means in response to the pressure imposed upon said sequence valve means, said sequence valve means being responsive to the pressure in said first feed line means as caused by torque increases or decreases of said first hydraulic motor for controlling the flow of pressurized fluid through said first and second servo valve means to said second and third hydraulic motors, respectively, whereupon the feed of the drill and the supply of the drilling fluid are dependent upon the resistance to rotation of the drill.

2. An apparatus as defined in claim 1, wherein said third feed line means further includes a restriction valve therein and a bypass line connected in parallel with said restriction valve, said bypass line being operatively associated with said second servo valve means, movement of said second servo valve means causing said bypass line to be opened for permitting flow of pressurized fluid therethrough around said restriction valve, thereby increasing the flow of pressurized fluid to said third hydraulic motor to thereby increase the flow of drilling fluid to said drill.

3. An apparatus as defined in claim 1, wherein said second hydraulic motor has inlet and outlet openings and said second feed line means has a primary feed line interconnected to said inlet and outlet openings of said second hydraulic motor for supplying pressurized fluid thereto, said second feed line means further having a bypass line connected in parallel with said primary line and bypassing said second hydraulic motor, said first servo valve means controlling the flow of fluid through said bypass line which in turn controls the flow of fluid flowing through said primary line to said second hydraulic motor, said first servo valve means being moved so as to open said bypass line when the pressure in said first feed line means as imposed upon said sequence valve means reaches a predetermined value, opening of the bypass line thus decreasing the flow of fluid to the second hydraulic motor so as to slow the speed thereof.

4. An apparatus as defined in claim 3, further including fourth feed line means interconnecting said source of pressurized fluid to said second hydraulic motor for supplying pressurized fluid thereto for driving same, third normally closed servo valve means connected to said fourth feed line means for preventing flow of fluid therethrough to said second hydraulic motor, said third servo valve means also being operatively interconnected to and controlled by said sequence valve means, said third servo valve means being opened by said sequence valve means when the pressure in said first feed line means reaches a second predetermined value which is greater than said first predetermined value, said fourth feed line means feeding fluid to said second hydraulic motor in a reverse direction to the direction of flow of fluid in said second feed line means whereupon flow of fluid through said fourth feed line means upon opening of said third servo valve means causes said second hydraulic motor to rotate in the reverse direction.

5. An apparatus as defined in claim 4, wherein said sequence valve means comprises a pair of substantially similar pressure valves, each of said pressure valves comprising a housing having a chamber therein, a piston slideably mounted within said chamber, one end of said chamber being interconnected to said first feed line means whereupon the pressurized fluid acts against one end of said piston, force means acting against the other end of said piston, said housing having a plurality of axially spaced ports in communication with said chamber, said ports being interconnected to said servo valve means, said piston being slideably moved within said chamber due to increases or decreases in the magnitude of the pressure of said pressurized fluid in said first feed line means so as to cause said ports to be covered or uncovered whereby said pressurized fluid is supplied to said servo valve means for controlling the movement thereof.

References Cited

UNITED STATES PATENTS

| | | | |
|---|---|---|---|
| 1,690,504 | 11/1928 | Rundqvist | 173—8 |
| 2,594,098 | 4/1952 | Vanderzee | 173—8 |
| 2,734,722 | 2/1956 | Pokorny | 173—8 |
| 2,804,751 | 9/1957 | Schroeder | 173—8 |
| 2,905,441 | 9/1959 | Poundstone | 173—8 |
| 3,039,543 | 6/1962 | Loocke | 175—38 X |
| 3,155,171 | 11/1964 | Kurt et al. | 175—27 X |
| 3,155,172 | 11/1964 | Kazmin et al. | 173—6 |

FOREIGN PATENTS

| | | |
|---|---|---|
| 860,490 | 2/1961 | Great Britain. |

OTHER REFERENCES

McGhee, Ed. Two-Man Crew Operates Hydraulic Rig. In Oil and Gas Journal, Sept. 22, 1958, pp. 92, 94, 95, 97, 98. (Copy in 175–27.)

CHARLES E. O'CONNELL, *Primary Examiner.*

I. A. CALVERT, *Assistant Examiner.*